(12) United States Patent
White et al.

(10) Patent No.: US 9,786,014 B2
(45) Date of Patent: Oct. 10, 2017

(54) EARNINGS ALERTS

(71) Applicant: Google Inc., Mountain View, CA (US)

(72) Inventors: Daniel Robert White, London (GB);
Daniel Matthew Goodridge, London (GB); Madeleine Cule, London (GB);
Gjokica Zafirovski, London (GB);
Louis Aidan Collard, London (GB)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/913,008

(22) Filed: Jun. 7, 2013

(65) Prior Publication Data

US 2017/0236211 A1    Aug. 17, 2017

(51) Int. Cl.
*G07B 17/00* (2006.01)
*G07F 19/00* (2006.01)
*G06Q 40/00* (2012.01)

(52) U.S. Cl.
CPC .................................. *G06Q 40/10* (2013.01)

(58) Field of Classification Search
None
See application file for complete search history.

(56) References Cited

U.S. PATENT DOCUMENTS

| | | | |
|---|---|---|---|
| 6,757,740 B1 | 6/2004 | Parekh et al. | |
| 6,801,945 B2 | 10/2004 | Lin et al. | |
| 7,539,635 B1 * | 5/2009 | Peak et al. | 705/31 |
| 7,779,360 B1 | 8/2010 | Jones et al. | |
| 7,979,301 B1 * | 7/2011 | Franco | 705/7.31 |
| 8,296,417 B1 | 10/2012 | Gershon et al. | |
| 8,325,036 B1 * | 12/2012 | Fuhr et al. | 340/540 |
| 8,472,328 B2 | 6/2013 | Gopalan et al. | |
| 2002/0046084 A1 * | 4/2002 | Steele et al. | 705/14 |
| 2003/0069821 A1 * | 4/2003 | Williams | 705/36 |
| 2004/0122735 A1 * | 6/2004 | Meshkin | 705/14 |
| 2006/0047590 A1 * | 3/2006 | Anderson et al. | 705/35 |
| 2007/0067297 A1 * | 3/2007 | Kublickis | 707/9 |
| 2007/0125860 A1 * | 6/2007 | Lapstun et al. | 235/462.01 |
| 2008/0294471 A1 | 11/2008 | Gupta et al. | |
| 2009/0037402 A1 | 2/2009 | Jones et al. | |
| 2010/0082526 A1 | 4/2010 | Wassingbo | |
| 2010/0121677 A1 * | 5/2010 | An et al. | 705/10 |
| 2010/0138360 A1 * | 6/2010 | Cutler et al. | 705/36 R |
| 2011/0264485 A1 * | 10/2011 | Notani et al. | 705/7.31 |
| 2012/0330812 A1 * | 12/2012 | Bouchard | 705/37 |
| 2013/0039543 A1 * | 2/2013 | Fuhr et al. | 382/103 |

(Continued)

OTHER PUBLICATIONS

Exponential Smoothing, wikipedia search result, printed Jun. 7, 2013, 8 pages.

(Continued)

*Primary Examiner* — Fateh M Obaid
(74) *Attorney, Agent, or Firm* — Foley & Lardner LLP;
John D. Lanza; Daniel Rose

(57) ABSTRACT

Systems and methods for earnings alerts include using a history of earnings by a content provider to generate an earnings forecast model. The earnings forecast model predicts future earnings by the content provider. An earnings alert is generated and provided to a device associated with the content provider based on a determination that the current earnings of the provider differ from the predicted earnings by a threshold amount.

20 Claims, 6 Drawing Sheets

(56) References Cited

U.S. PATENT DOCUMENTS

| | | |
|---|---|---|
| 2013/0073388 A1 | 3/2013 | Heath |
| 2013/0124376 A1* | 5/2013 | Lefebvre et al. ............... 705/34 |
| 2013/0179220 A1* | 7/2013 | Notani et al. ................ 705/7.31 |
| 2013/0291126 A1* | 10/2013 | Thomson ........................ 726/30 |
| 2013/0339519 A1 | 12/2013 | Lientz |
| 2014/0025422 A1* | 1/2014 | An et al. ...................... 705/7.25 |

OTHER PUBLICATIONS

Google Now Card List websearch, url: https://support.google.com/websearch/answer/2839499?hl=en, retreived from internet May 20, 2013, 27 pages.
Office Action on U.S. Appl. No. 13/924,096 dated Apr. 24, 2015.
Office Action on U.S. Appl. No. 13/963,234 dated Jun. 24, 2015.
The New Look Allow & Block Ads Tab, Google AdSense, 2 pages.
Office Action on U.S. Appl. No. 13/924,096 dated Oct. 22, 2015.
Office Action on U.S. Appl. No. 13/963,234 dated Feb. 2, 2016.

\* cited by examiner

EARNINGS ALERTS

BACKGROUND

Online content may be received from various first-party or third-party sources. In general, first-party content refers to the primary online content requested or displayed by a user's device. For example, first-party content may be a webpage requested by the client or a stand-alone application (e.g., a video game, a chat program, etc.) running on the device. Third-party content, in contrast, refers to additional content that may be provided in conjunction with the first-party content. For example, third-party content may be a public service announcement or advertisement that appears in conjunction with a requested webpage (e.g., a search result webpage from a search engine, a webpage that includes an online article, a webpage of a social networking service, etc.) or within a stand-alone application (e.g., an advertisement within a game). More generally, a first-party content provider may be any content provider that allows another content provider (i.e., a third-party content provider) to provide content in conjunction with that of the first-party.

SUMMARY

Implementations of the systems and methods for earnings alerts are disclosed herein. One implementation is a method of generating an earnings alert. The method includes retrieving, from a storage device, a history of earnings for a content provider received in exchange for the ability to present third-party content with content from the content provider. The method also includes generating, by a processor, predicted future earnings of the content provider using an earnings forecast model based on the history of earnings. The method further includes determining an earnings threshold value at which differences from the predicted future earnings are statistically significant. The method additionally includes determining, by the processor, current earnings of the content provider. The method yet further includes generating, by the processor, an earnings alert based on a determination that the difference between the current earnings of the content provider and the predicted earnings exceeds the earnings threshold value. The method also includes providing the earnings alert to a device associated with the content provider.

Another implementation is a system for generating an earnings alert. The system includes one or more processors configured to retrieve, from a storage device, a history of earnings for a content provider received in exchange for the ability to present third-party content with content from the content provider. The one or more processors are also configured to generate predicted future earnings of the content provider using an earnings forecast model based on the history of earnings. The one or more processors are further configured to determine an earnings threshold value at which differences from the predicted future earnings are statistically significant. The one or more processors are additionally configured to determine current earnings of the content provider and to generate an earnings alert based on a determination that the difference between the current earnings of the content provider and the predicted earnings exceeds the earnings threshold value. The one or more processors are also configured to provide the earnings alert to a device associated with the content provider.

A further implementation is a computer-readable storage medium having machine instructions stored therein, the instructions being executable by a processor to cause the processor to perform operations. The operations include retrieving, from a storage device, a history of earnings for a content provider received in exchange for the ability to present third-party content with content from the content provider. The operations also include generating predicted future earnings of the content provider using an earnings forecast model based on the history of earnings. The operations further include determining an earnings threshold value at which differences from the predicted future earnings are statistically significant. The operations additionally include determining current earnings of the content provider and generating an earnings alert based on a determination that the difference between the current earnings of the content provider and the predicted earnings exceeds the earnings threshold value. The operations yet further include providing the earnings alert to a device associated with the content provider.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
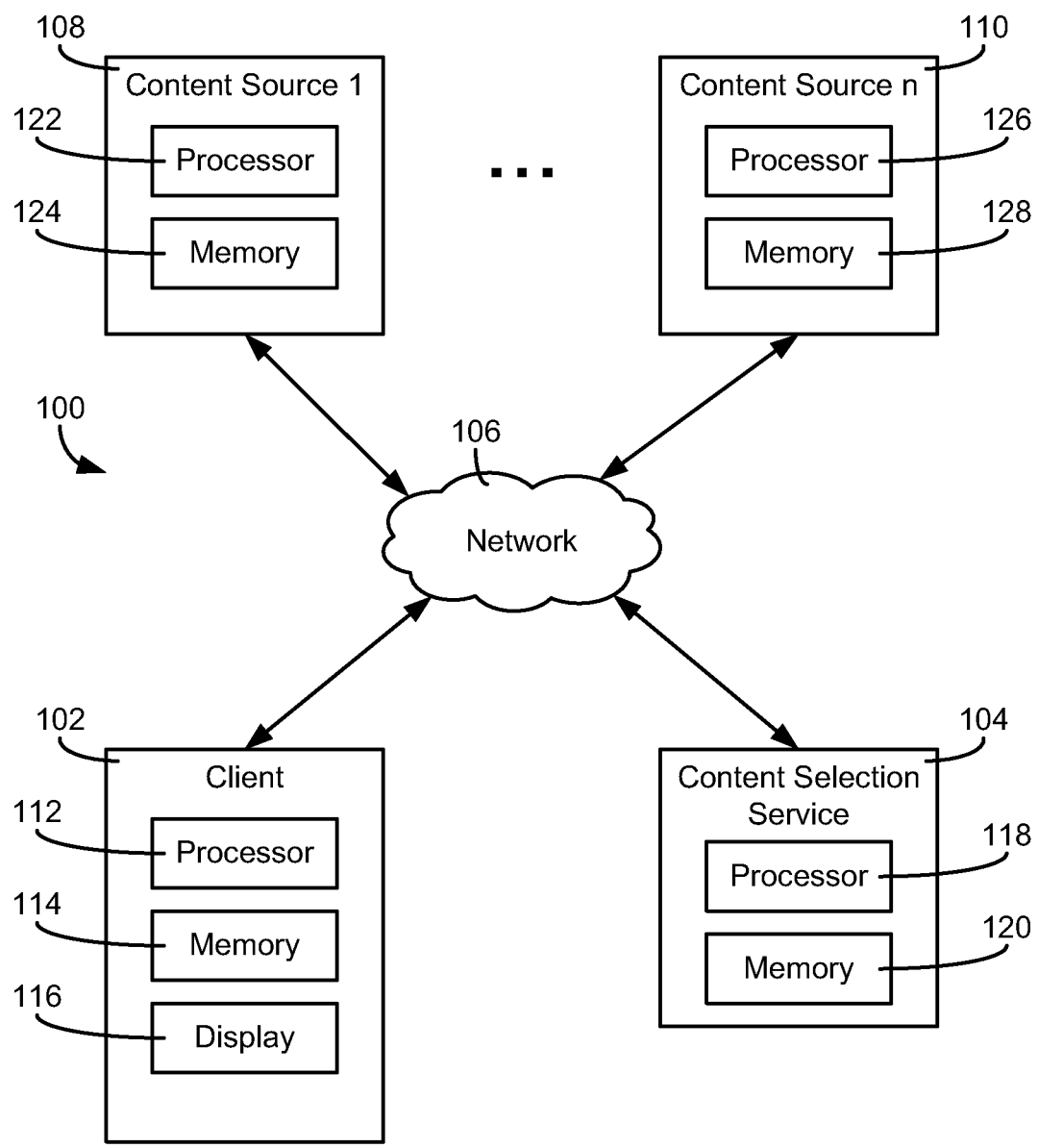
FIG. 1 is a block diagram of a computer system in which third-party content is selected for presentation with first-party content.

According to various aspects of the present disclosure, a first-party content provider may allow a content selection service to determine which third-party content is to be provided in conjunction with the first-party provider's content. In exchange for doing so, the first-party content provider may receive a portion of any revenues collected by the content selection service from third-party content providers. For example, a website operator may allow third-party advertisements to be selected by a content selection service for placement on the pages of the website. In turn, the content selection service may charge the third-party content providers that place content on the website a certain amount and apportion a percentage of this amount to the first-party content provider.

Any number of factors may influence the amount of earnings received by a first-party content provider in a given time period. In general, the amount of earnings received by a first-party content provider is influenced most heavily by the amount of traffic to the provider's website. In other words, the greater the number of visits to the website, the greater the opportunity to provide third-party content with the website. However, other factors also exist that may influence the earnings of a first-party content provider. For example, a provider's earnings may also be influenced by the content of the website (e.g., certain topics may be more attractive to advertisers than others), the types of visitors to the website, preferences set by the first-party content provider to control which third-party content is eligible for selection by the content selection service for presentation on the website (e.g., the first-party content provider may only allow certain types of advertisements on his or her website), and other such factors.

According to various implementations, a content selection service may be configured to alert a first-party content provider to unexpected changes to the provider's earnings. In some implementations, the content selection service may be configured to generate an earnings prediction model using a history earnings by the first-party content provider. Based on an earnings forecast predicted by the model, the content selection service may determine one or more earnings threshold values that correspond to the points at which deviations from the predicted earnings are statistically significant. The content selection service may also be configured to generate and provide an earnings alert if the current earnings of the first-party content provider are outside of the one or more earnings threshold values. For example, the content selection service may provide an alert to a first-party content provider that his or her daily earnings are 25% below the forecasted earnings for that day. The earnings alert may be provided to a device associated with the first-party content provider on a push or pull basis, in various implementations. In other words, the alert may be provided to the device in response to a request for such data or, in another implementation, may be provided to the device automatically in response the alert being generated.

Referring to FIG. 1, a block diagram of a computer system 100 in accordance with a described implementation is shown. System 100 includes a client device 102 which communicates with other computing devices via a network 106. Client device 102 may execute a web browser or other application (e.g., a video game, a messenger program, a media player, a social networking application, etc.) to retrieve content from other devices over network 106. For example, client device 102 may communicate with any number of content sources 108, 110 (e.g., a first content source through nth content source). Content sources 108, 110 may provide webpage data and/or other content, such as images, video, and audio, to client device 102. Computer system 100 may also include a content selection service 104 configured to select third-party content to be provided to client device 102. For example, content source 108 may provide a first-party webpage to client device 102 that includes additional third-party content selected by content selection service 104.

Network 106 may be any form of computer network that relays information between client device 102, content sources 108, 110, and content selection service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client device 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). In some implementations, the type of client device 102 may be categorized as being a mobile device, a desktop device (e.g., a device intended to remain stationary or configured to primarily access network 106 via a local area network), or another category of electronic devices (e.g., tablet devices may be a third category, etc.). Client device 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, HTML, XML, Python and Visual Basic.

Client device 102 may include one or more user interface devices. A user interface device may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other data received from content sources 108, 110 and/or content selection service 104. In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Content sources 108, 110 may be one or more electronic devices connected to network 106 that provide content to devices connected to network 106. For example, content sources 108, 110 may be computer servers (e.g., FTP servers, file sharing servers, web servers, etc.) or combinations of servers (e.g., data centers, cloud computing platforms, etc.). Content may include, but is not limited to, webpage data, a text file, a spreadsheet, images, search results, other forms of electronic documents, and applications executable by client device 102. For example, content source 108 may be an online search engine that provides search result data to client device 102 in response to a search query. In another example, content source 110 may be a first-party web server that provides webpage data to client device 102 in response to a request for the webpage. Similar to client device 102, content sources 108, 110 may include processors 122, 126 and memories 124, 128, respectively, that store program instructions executable by processors 122, 126. For example, the processing circuit of content source 108 may include instructions such as web server software, FTP serving software, and other types of software that cause content source 108 to provide content via network 106.

According to various implementations, content sources 108, 110 may provide first-party webpage data to client device 102 that includes one or more content tags. In general, a content tag refers to any piece of webpage code associated with the action of including third-party content with a first-party webpage. For example, a content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., content sources 108, 110, content selection service 104, etc.), a network location (e.g., a URL) associated with clicking on the third-party content, how the third-party content is to be rendered on a display, a command that causes client device 102 to set a browser cookie (e.g., via a pixel tag that sets a cookie via an image request), one or more keywords used to retrieve the third-party content, and other functions associated with providing third-party content with a first-party webpage. For example, content source 108 may serve first-party webpage data to client device 102 that causes client device 102 to retrieve third-party content from content selection service 104. In another implementation, content may be selected by content selection service 104 and provided by content source 108 as part of the first-party webpage data sent to client device 102. In a further example, content selection service 104 may cause client device 102 to retrieve third-party content from a specified location, such as memory 114 or content sources 108, 110.

Content selection service 104 may also be one or more electronic devices connected to network 106. Content selection service 104 may be a computer server (e.g., FTP servers, file sharing servers, web servers, etc.) or a combination of servers (e.g., a data center, a cloud computing platform, etc.). Content selection service 104 may have a processing circuit including a processor 118 and a memory 120 that stores program instructions executable by processor 118. In cases in which content selection service 104 is a combination of computing devices, processor 118 may represent the collective processors of the devices and memory 120 may represent the collective memories of the devices.

Content selection service 104 may be configured to select third-party content for client device 102 (i.e., content selection service 104 may provide a third-party content selection service). In one implementation, the selected third-party content may be provided by content selection service 104 to client device 102 via network 106. For example, content source 110 may upload the third-party content to content selection service 104. Content selection service 104 may then provide the third-party content to client device 102 to be presented in conjunction with first-party content provided by any of content sources 108, 110. In other implementations, content selection service 104 may provide an instruction to client device 102 that causes client device 102 to retrieve the selected third-party content (e.g., from memory 114 of client device 102, from content source 110, etc.). For example, content selection service 104 may select third-party content to be provided as part of a first-party webpage being visited by client device 102 or within a first-party application being executed by client device 102 (e.g., within a game, messenger application, etc.).

In some implementations, content selection service 104 may be configured to select content based on a device identifier associated with client device 102. In general, a device identifier refers to any form of data that may be used to represent a device or software that receives content selected by content selection service 104. In some implementations, a device identifier may be associated with one or more other device identifiers (e.g., a device identifier for a mobile device, a device identifier for a home computer, etc.). Device identifiers may include, but are not limited to, cookies, device serial numbers, user profile data, or network addresses. For example, a cookie set on client device 102 may be used to identify client device 102 to content selection service 104.

For situations in which the systems discussed herein collect personal information about a user, or may make use of personal information, the user may be provided with an opportunity to control which programs or features collect such information, the types of information that may be collected (e.g., information about a user's social network, social actions or activities, a user's preferences, a user's current location, etc.), and/or how third-party content may be selected by content selection service 104 and presented to the user. Certain data, such as a device identifier, may be anonymized in one or more ways before it is stored or used, so that personally identifiable information is removed when generating parameters (e.g., demographic parameters) used by content selection service 104 to select third-party content. For example, a device identifier for client device 102 may be anonymized so that no personally identifiable information about its corresponding user can be determined by content selection service 104 from it. In another example, a user's geographic location may be generalized where location information is obtained (such as to a city, ZIP code, or state level), so that a precise location of the user cannot be determined. Thus, the user of client device 102 may have control over how information is collected about him or her and used by content selection service 104.

If the user of client device 102 has elected to allow content selection service 104 to use information regarding him or her, content selection service 104 may use history data associated with a device identifier to select relevant content for the corresponding user. History data may be any data associated with a device identifier that is indicative of an online event (e.g., visiting a webpage, interacting with presented content, conducting a search, making a purchase, downloading content, etc.). Based in part on the analyzed history data, content selection service 104 may select third-party content to be provided in conjunction with first-party content (e.g., as part of a displayed webpage, as a pop-up, within a video game, within another type of application, etc.). Additional data associated with a device identifier may include, but is not limited to, the device type of client device 102 (e.g., whether client device 102 is a desktop or mobile device), the location of client device 102, or a search query generated by client device 102. For example, content selection service 104 may select third-party content to be provided as part of a first-party webpage or in conjunction with search results from one of content sources 108, 110.

Content selection service 104 may analyze the history data associated with a device identifier to identify one or more topics that may be of interest. For example, content selection service 104 may perform text and/or image analysis on a webpage from content source 108, to determine one or more topics of the webpage. In some implementations, a topic may correspond to a predefined interest category used by content selection service 104. For example, a webpage devoted to the topic of golf may be classified under the interest category of sports. In some cases, interest categories used by content selection service 104 may conform to a taxonomy (e.g., an interest category may be classified as falling under a broader interest category). For example, the interest category of golf may be /Sports/Golf, /Sports/Individual Sports/Golf, or under any other hierarchical category. Similarly, content selection service 104 may analyze the content of a first-party webpage accessed by client device 102 to identify one or more topical categories for the webpage. For example, content selection service 104 may use text or image recognition on the webpage to determine that the webpage is devoted to the topical category of /Sports/Golf.

Content selection service 104 may receive history data indicative of one or more online events associated with a device identifier. In implementations in which a content tag causes client device 102 to request content from content selection service 104, such a request may include a device identifier for client device 102 and/or additional information (e.g., the webpage being loaded, the referring webpage, etc.). For example, content selection service 104 may receive and store history data regarding whether or not third-party content provided to client device 102 was selected using an interface device (e.g., the user of client device 102 clicked on a third-party hyperlink, third-party image, etc.). Content selection service 104 may store such data to record a history of online events associated with a device identifier. In some cases, client device 102 may provide history data to content selection service 104 without first executing a content tag. For example, client device 102 may periodically send history data to content selection service 104 or may do so in response to receiving a command from a user interface device. In some implementations, content selection service 104 may receive history data from content sources 108, 110. For example, content source 108 may store history data regarding web transactions with client device 102 and provide the history data to content selection service 104.

Content selection service 104 may apply one or more weightings to an interest or product category, to determine whether the category is to be associated with a device identifier. For example, content selection service 104 may impose a maximum limit to the number of product or interest categories associated with a device identifier. The top n-number of categories having the highest weightings may then be selected by content selection service 104 to be associated with a particular device identifier. A category weighting may be based on, for example, the number of webpages visited by the device identifier regarding the category, when the visits occurred, how often the topic of the category was mentioned on a visited webpage, or any online actions performed by the device identifier regarding the category. For example, topics of more recently visited webpages may receive a higher weighting than webpages that were visited further in the past. Categories may also be subdivided by the time periods in which the webpage visits occurred. For example, the interest or product categories may be subdivided into long-term, short-term, and current categories, based on when the device identifier visited a webpage regarding the category.

Content selection service 104 may be configured to conduct a content auction among third-party content providers to determine which third-party content is to be provided to client device 102. For example, content selection service 104 may conduct a real-time content auction in response to client device 102 requesting first-party content from one of content sources 108, 110 or executing a first-party application. Content selection service 104 may use any number of factors to determine the winner of the auction. For example, the winner of a content auction may be based in part on the third-party provider's bid and/or a quality score for the third-party provider's content (e.g., a measure of how likely the user of client device 102 is to click on the content). In other words, the highest bidder is not necessarily the winner of a content auction conducted by content selection service 104, in some implementations.

Content selection service 104 may be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at client device 102. In other words, the bid amount may be on a cost per impression or cost per thousand impressions (CPM) basis. In further cases, a bid amount may correspond to a specified action being performed in response to the third-party content being presented at a client device. For example, a bid amount may be a monetary amount that the third-party content provider is willing to pay, should their content be clicked on at the client device, thereby redirecting the client device to the provider's webpage. In other words, a bid amount may be a cost per click (CPC) bid amount. In another example, the bid amount may correspond to an action being performed on the third-party provider's website, such as the user of client device 102 making a purchase. Such bids are typically referred to as being on a cost per acquisition (CPA) or cost per conversion basis.

A campaign created via content selection service 104 may also include selection parameters that control when a bid is placed on behalf of a third-party content provider in a content auction. If the third-party content is to be presented in conjunction with search results from a search engine, for example, the selection parameters may include one or more sets of search keywords. For example, the third-party content provider may only participate in content auctions in which a search query for "golf resorts in California" is sent to a search engine. Other example parameters that control when a bid is placed on behalf of a third-party content provider may include, but are not limited to, a topic identified using a device identifier's history data (e.g., based on webpages visited by the device identifier), the topic of a webpage or other first-party content with which the third-party content is to be presented, a geographic location of the client device that will be presenting the content, or a geographic location specified as part of a search query. In some cases, a selection parameter may designate a specific webpage, website, or group of websites with which the third-party content is to be presented. For example, an advertiser selling golf equipment may specify that they wish to place an advertisement on the sports page of an particular online newspaper.

According to various implementations, content selection service 104 is configured to apportion a percentage of earnings from a third-party content provider to the provider of the first-party content with which the third-party content is presented. For example, content selection service 104 may apportion 40% of the revenues received from a third-party content provider to the operator of content source 108 whenever the third-party content is selected for presentation on a website from content source 108. In some implementations, content selection service 104 may store a history of earnings for a first-party content provider in memory 120 and use the history to generate an earnings prediction model that predicts future earnings for the first-party content provider. Content selection service 104 may generate an earnings threshold value that corresponds to a deviation from the future earnings for the first-party content provider predicted using the model. In some implementations, content selection service 104 may generate an earnings alert in response to a determination that the current earnings of a first-party content provider are higher or lower than the earnings threshold value (e.g., whether the current earnings of the provider deviate from the earnings predicted by the model by a threshold amount). Thus, content selection service 104 may alert a first-party content provider to situations in which the provider's earnings have experienced an unexpected change.

Figure 2:
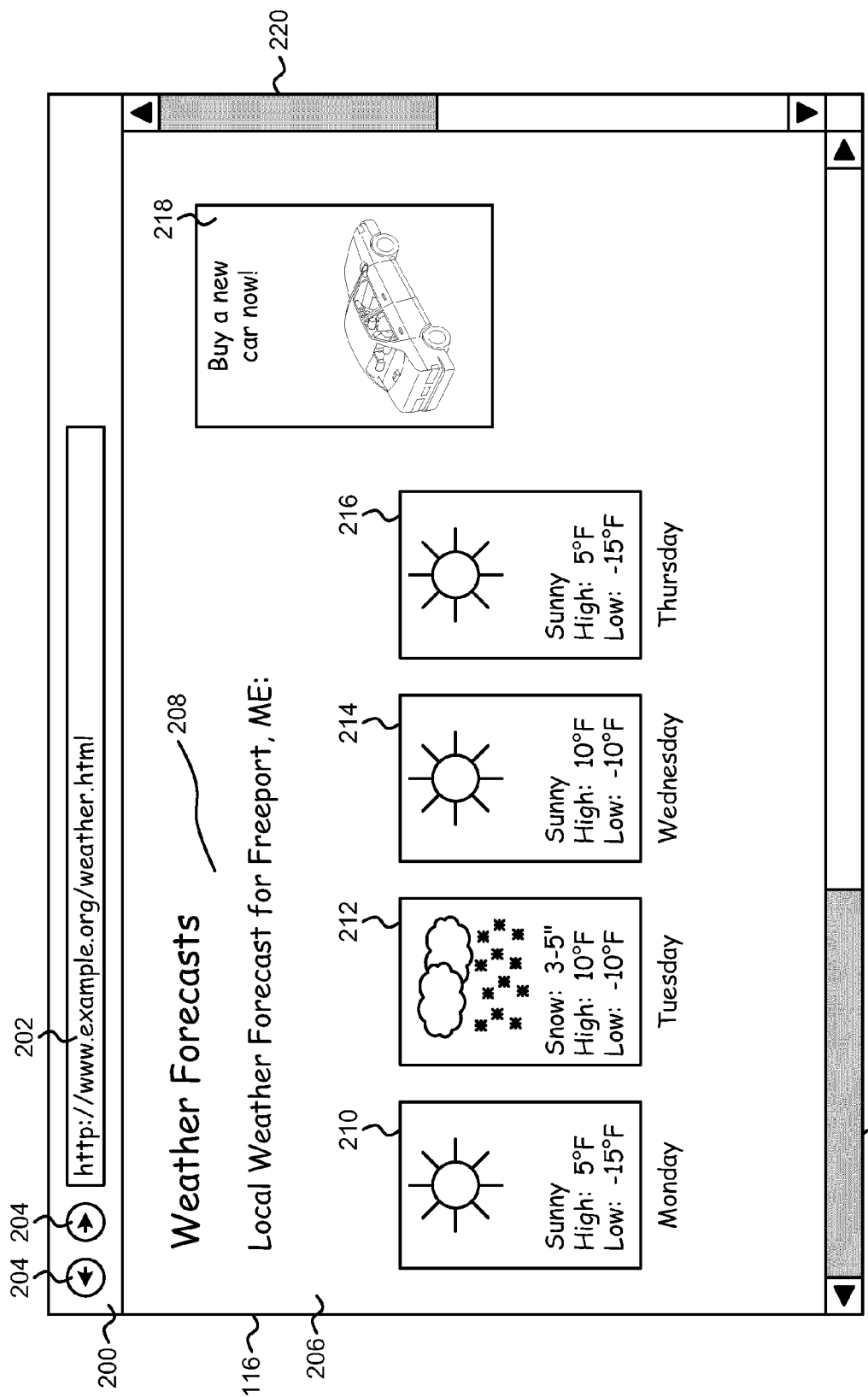
FIG. 2 is an illustration of an electronic display showing a first-party webpage with embedded third-party content.

Referring now to FIG. 2, an illustration is shown of electronic display 116 displaying an example first-party webpage 206. Electronic display 116 is in electronic communication with processor 112 which causes visual indicia to be displayed on electronic display 116. As shown, processor 112 may execute a web browser 200 stored in memory 114 of client device 102, to display indicia of content received by client device 102 via network 106. In other implementations, another application executed by client device 102 may incorporate some or all of the functionality described with regard to web browser 200 (e.g., a video game, a chat application, etc.).

Web browser 200 may operate by receiving input of a uniform resource locator (URL) via a field 202 from an input device (e.g., a pointing device, a keyboard, a touch screen, etc.). For example, the URL, http://www.example.org/weather.html, may be entered into field 202. Processor 112 may use the inputted URL to request data from a content source having a network address that corresponds to the entered URL. In other words, client device 102 may request first-party content accessible at the inputted URL. In response to the request, the content source may return webpage data and/or other data to client device 102. Web browser 200 may analyze the returned data and cause visual indicia to be displayed by electronic display 116 based on the data.

In general, webpage data may include text, hyperlinks, layout information, and other data that may be used to provide the framework for the visual layout of first-party webpage 206. In some implementations, webpage data may be one or more files of webpage code written in a markup language, such as the hypertext markup language (HTML), extensible HTML (XHTML), extensible markup language (XML), or any other markup language. For example, the webpage data in FIG. 2 may include a file, "weather.html" provided by the website, "www.example.org." The webpage data may include data that specifies where indicia appear on first-party webpage 206, such as text 208. In some implementations, the webpage data may also include additional URL information used by web browser 200 to retrieve additional indicia displayed on first-party webpage 206. For example, the file, "weather.html," may also include one or more instructions used by processor 112 to retrieve images 210-216 from their respective content sources.

Web browser 200 may include a number of navigational controls associated with first-party webpage 206. For example, web browser 200 may be configured to navigate forward and backwards between webpages in response to receiving commands via inputs 204 (e.g., a back button, a forward button, etc.). Web browser 200 may also include one or more scroll bars 220, which can be used to display parts of first-party webpage 206 that are currently off-screen. For example, first-party webpage 206 may be formatted to be larger than the screen of electronic display 116. In such a case, the one or more scroll bars 220 may be used to change the vertical and/or horizontal position of first-party webpage 206 on electronic display 116.

First-party webpage 206 may be devoted to one or more topics. For example, first-party webpage 206 may be devoted to the local weather forecast for Freeport, Me. In some implementations, a content selection server, such as content selection service 104, may analyze the contents of first-party webpage 206 to identify one or more topics. For example, content selection service 104 may analyze text 208 and/or images 210-216 to identify first-party webpage 206 as being devoted to weather forecasts. In some implementations, webpage data for first-party webpage 206 may include metadata that identifies a topic.

In various implementations, content selection service 104 may select some of the content presented on first-party webpage 206 (e.g., an embedded image or video, etc.) or in conjunction with first-party webpage 206 (e.g., in a pop-up window or tab, etc.). For example, content selection service 104 may select third-party content 218 to be included on webpage 206. In some implementations, one or more content tags may be embedded into the code of webpage 206 that defines a content field located at the position of third-party content 218. Another content tag may cause web browser 200 to request additional content from content selection service 104, when first-party webpage 206 is loaded. Such a request may include one or more keywords, a device identifier for client device 102, or other data used by content selection service 104 to select content to be provided to client device 102. In response, content selection service 104 may select third-party content 218 for presentation on first-party webpage 206.

Content selection service 104 may select third-party content 218 (e.g., an advertisement) by conducting a content auction, in some implementations. Content selection service 104 may also determine which third-party content providers compete in the auction based in part on campaign parameters set by the providers. For example, only content providers that specified a topic that matches that of webpage 206, an interest category of a device identifier accessing webpage 206, or webpage 206 specifically may compete in the content auction. Based on bidding parameters for these third-party content providers, content selection service 104 may compare their bid amounts, quality scores, and/or other values to determine the winner of the auction and select third-party content 218 for presentation with webpage 206.

In some implementations, content selection service 104 may provide third-party content 218 directly to client device 102. In other implementations, content selection service 104 may send a command to client device 102 that causes client device 102 to retrieve third-party content 218. For example, the command may cause client device 102 to retrieve third-party content 218 from a local memory, if third-party content 218 is already stored in memory 114, or from a networked content source. In this way, any number of different pieces of content may be placed in the location of third-party content 218 on first-party webpage 206. In other words, one user that visits first-party webpage 206 may be presented with third-party content 218 and a second user that visits first-party webpage 206 may be presented with different content. Other forms of content (e.g., an image, text, an audio file, a video file, etc.) may be selected by content selection service 104 for display with first-party webpage 206 in a manner similar to that of third-party content 218. In further implementations, content selected by content selection service 104 may be displayed outside of first-party webpage 206. For example, content selected by content selection service 104 may be displayed in a separate window or tab of web browser 200, may be presented via another software application (e.g., a text editor, a media player, etc.), or may be downloaded to client device 102 for later use.

Figure 3:
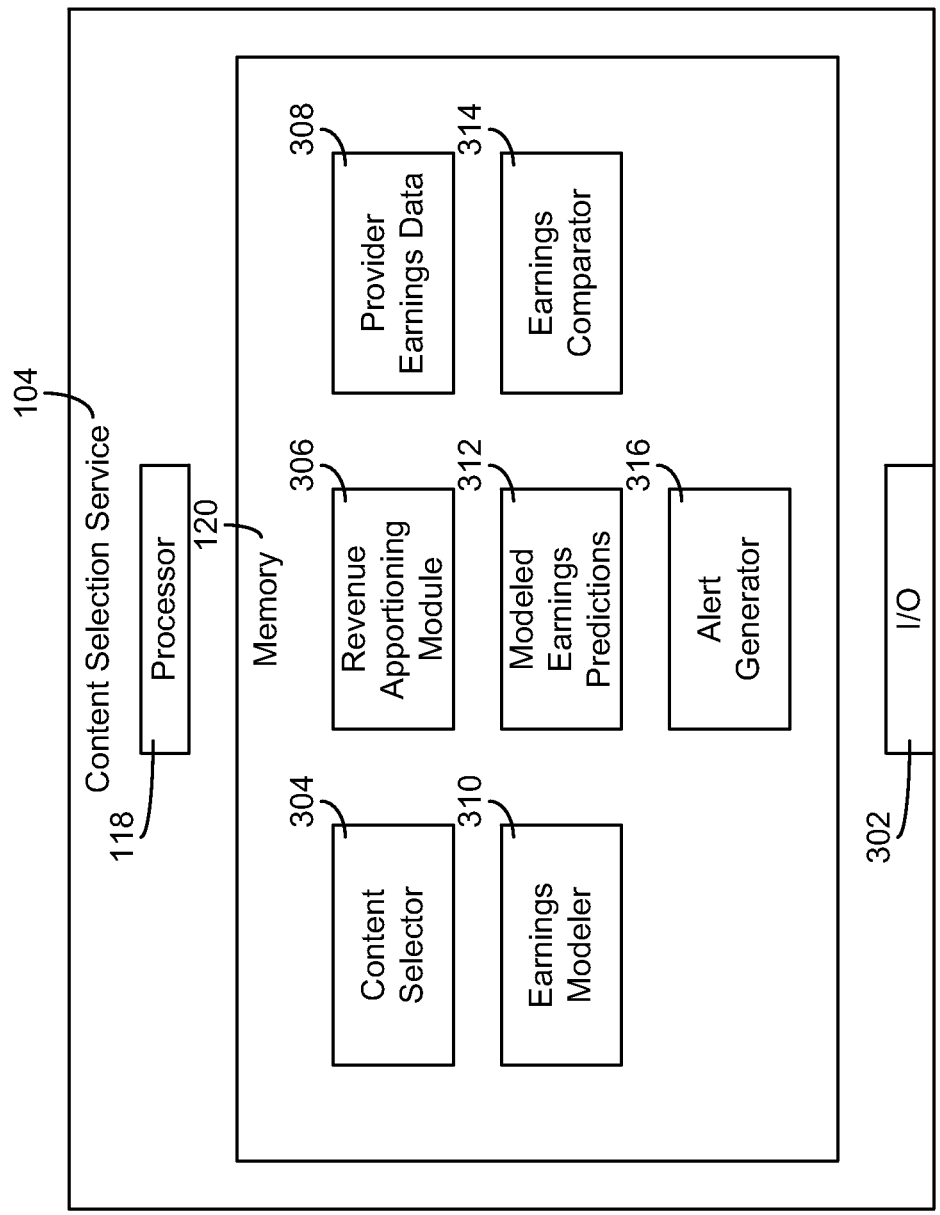
FIG. 3 is a detailed block diagram of the content selection service of FIG. 1, according to various implementations.

Referring now to FIG. 3, a detailed block diagram of the content selection service 104 of FIG. 1 is shown, according to various implementations. As shown, content selection service 104 may include a number of hardware components in electronic communication with one another configured to generate and provide an earnings alert to a first-party content provider. For example, content selection service 104 may include input and/or output (I/O) hardware 302 in electronic communication with processor 118 that is configured to receive data from another computing device (e.g., an indication of an interaction with third-party content by a client device, account settings from content providers, etc.) and/or provide data to another computing device (e.g., an earnings warning, etc.) via network 106. Content selection service 104 may also include various software modules in memory 120 that, when executed by processor 118, cause processor 118 to perform the functions described herein.

Memory 120 may include a content selector 304 that is configured to select third-party content for presentation in conjunction with first-party content. In some implementations, content selector 304 may receive a content selection request via I/O hardware 302 from a client device accessing the first-party content or from the source of the first-party content itself. For example, content selector 304 may receive a content selection request from a client device in response to the client device executing a content tag embedded into a first-party webpage accessed by the client device. In response, content selector 304 may determine which piece or pieces of third-party content are to be presented with the first-party webpage.

Content selector 304 may base a content selection on any number of factors. In some implementations, content selector 304 may conduct a content auction in which bids are placed on behalf of third-party content providers. Such bids may be specified directly by the third-party content providers or generated automatically by content selector 304 based on auction parameters specified by the third-party content providers. For example, a third-party content provider may specify a minimum, maximum, or target bid as part of an advertising campaign. In another example, a third-party content provider may select a bidding strategy to achieve a particular goal (e.g., to maximize the number of impressions, clicks, conversions, etc. for the third-party content provider's content). In a further example, bids may be generated by content selector 304 on behalf of a third-party content provider based on a specified budget (e.g., a daily budget, a weekly budget, etc.). In other implementations, content selector 304 may select third-party content based on an agreement between the first-party content provider and a third-party content provider in which the third-party content provider is allowed to place content with the first-party content for a specified amount of time (e.g., a particular advertisement may be shown on the first-party provider's website for a week).

In some implementations, content selector 304 may be configured to determine whether certain third-party content is even eligible for selection for a particular piece of first-party content. For example, content selector 304 may base the eligibility of third-party content for selection on parameters set by either or both of the first and third-party content providers. In one implementation, the first-party content provider may set parameters that control which types of third-party content are eligible for presentation with the first-party content (e.g., the topics of third-party content that are prohibited or eligible for selection, whether third-party content related to a user interest category is eligible for selection, etc.). In a further implementation, the third-party content provider may specify parameters that control the types of devices for which their content is eligible for selection (e.g., desktop devices, mobile devices, specific hardware or software device configurations, etc.), the geographic locations of eligible devices, user interest categories, or the like. Thus, content selector 304 may determine whether a piece of third-party content is even eligible for selection for a particular client device or with a particular piece of first-party content before generating an auction bid on behalf of the third-party content provider.

In one implementation, content selector 304 may base the selection of third-party content on one or more quality scores. In general, a quality score may represent the likelihood of a user interacting with a piece of third-party content (e.g., clicking on the content, playing the content, etc.), how closely a third-party website hyperlinked to the third-party content relates to the third-party content, how closely a topic of the third-party content matches a topic of the first-party content, or combinations thereof. In some cases, content selector 304 may combine a quality score with a generated auction bid for a third-party content provider, to determine whether content from the provider is selected for presentation. For example, content selector 304 may add a quality score and an auction bid for a third-party content provider to determine an overall score and compare overall scores among providers, to select third-party content. Thus, the third-party content provider having a high auction bid, but a low quality score, may not be guaranteed that his or her content will be selected by content selector 304.

Memory 120 may store a revenue apportioning module 306 configured to apportion revenues from a third-party content provider between the operator of content selection service 104 and the first-party content provider. Revenue apportioning module 306 may receive an indication of which third-party content was selected by content selector 304 and apportion revenues from the corresponding third-party content provider accordingly. In some instances, revenue apportioning module 306 may apportion a set percentage of revenues from a third-party content provider to a first-party content provider. The percentage may be a fixed amount or on a progressive scale, in various implementations. For example, a first-party website that reaches a certain traffic volume within a period of time may receive an increase to their allotted percentage.

Revenue apportioning module 306 may store data regarding the revenues apportioned to a first-party content provider as provider earnings data 308. Provider earnings data 308 may include data regarding a first-party content provider's revenues with varying degrees of granularity. For example, provider earnings data 308 may include data regarding each transaction (e.g., the amount of earnings apportioned to the first-party content provider each time third-party content was presented with the first-party content) or may include aggregated earnings over one or more time periods (e.g., hourly earnings, daily earnings, weekly earnings, monthly earnings, etc.). In some implementations, provider earnings data 308 may also include the current earnings of a first-party content provider, which may be defined as earnings apportioned to the first-party content provider within a predefined amount of time to the present or within a given time frame. For example, current earnings in provider earnings data 308 may include the provider's earnings within the past three hours or may include a cumulative total of the provider's earnings in the current day.

In one implementation, revenue apportioning module 306 may break down the earnings of a provider according to any number of different categories. For example, revenue apportioning module 306 may subdivide the earnings of a first-party content provider based on the geographic locations of the client devices that received the third-party content (e.g., apportioned revenues may be broken down by country, state, zip code, etc.), the types of devices that received the third-party content (e.g., apportioned revenues may be broken down by device type, such as desktop devices, tablet devices, mobile devices, etc.), different pieces of first-party content provided by the first-party content provider (e.g., the first-party content provider may have multiple websites, mobile applications, etc.), by time period (e.g., hourly, every several hours, daily, weekly, etc.), combinations thereof, or the like. Thus, revenue apportioning module 306 may determine one or more breakdowns of the revenues apportioned to a first-party content provider.

According to various implementations, processor 118 may execute a earnings modeler 310 that is configured to use a history of earnings in provider earnings data 308 to generate one or more modeled earnings predictions 312. Earnings modeler 310 may use earnings data from any number of different timeframes to generate modeled earnings predictions 312. For example, earnings modeler 310 may generate modeled earnings predictions 312 using the earnings of a first-party content provider in the previous week, month, year, etc., or the entire history of earnings by the provider. Earnings modeler 310 may also update modeled earnings predictions 312 at any time, such as hourly, daily, at any other periodic time, or in response to a request to regenerate modeled earnings predictions 312. Modeled earnings predictions 312 may be modeled by earnings modeler 310 based on exponential smoothing (e.g., Holt-Winters smoothing, etc.) or on any other predictive model. In general, an exponential smoothing model uses a time series of data to make forecasts for future time periods (e.g., a moving average). A smoothing function is also used to apply a smoothing effect to the time series, to reduce the effects of abnormal spikes and dips in earnings. In one implementation, earnings modeler 310 may use one or more breakdowns of earnings data from revenue apportioning module 306 to generate modeled earnings predictions 312. For example, earnings prediction module 312 may predict future earnings of a first-party content provider for one or more device types (e.g., future earnings for mobile devices, desktop devices, etc.), one or more geographic locations, one or more sets of first-party content (e.g., webpages, websites, mobile applications, etc.), or the like.

Processor 118 may, in some implementations, execute an earnings comparator 314 stored in memory 120. In general, earnings comparator 314 may be configured to compare a set of current earnings by a first-party content provider in provider earnings data 308 to modeled earnings predictions 312. Current earnings may be from any period of time, such as the last hour, day, week, etc. For example, current earnings may be from the current day and/or include earnings from the previous three days. If a time series of earnings is used by earnings modeler 310 to generate modeled earnings predictions 312, the current earnings may be from the same length of time as the time periods in the time series. For example, if the time series uses hourly earnings as data points, the current earnings may correspond to earnings from the prior hour. Similarly, earnings data that has been broken down by revenue apportioning module 306 may be compared to the corresponding modeled earnings predictions 312 (e.g., current earnings for mobile devices may be compared to a model that predicts future earnings for mobile devices, etc.).

Earnings comparator 314 may generate one or more earnings threshold values for comparison with the current earnings. An earnings threshold may be above or below the earnings predicted by modeled earnings predictions 312. In some implementations, an earnings threshold may correspond to an earnings value at which a deviation from the predicted earnings is statistically significant. For example, earnings comparator 314 may determine an average-mean squared error at each point in time by comparing the forecast and actual earnings. Earnings comparator 314 may then use the average error to calculate a confidence threshold at a desired level, to determine the one or more earnings threshold values. For example, earnings comparator 314 may determine that a predicted daily earnings of $150 may have an actual earnings value between $125 and $175 with a 95% degree of confidence. Thus, either $125 or $175 may be used as an earnings threshold value by earnings comparator 314.

If earnings comparator 314 determines that the current earnings are outside of a range defined by the one or more earnings threshold values in relation to the predicted earnings, earnings comparator 314 may provide an indication of this to alert generator 316. For example, alert generator 316 may generate an alert that a provider's total earnings are off from the predicted earnings by a certain amount or may generate an alert that the provider's earnings along one or more categories (e.g., geolocation, device type, first-party content, etc.) is off from the predicted earnings in that category by a certain amount. Alert generator 316 may be configured to generate and provide an alert to a device associated with a first-party content provider. For example, alert generator 316 may provide an earnings alert as part of a webpage, as data sent to a stand-alone application executed by the device, as an email, as a text message, or the like. In some implementations, the alert generated by alert generator 316 may be included as part of an earnings warning card (e.g., a widget application that aggregates earnings data and may be presented with other widgets). Alert generator 316 may provide the alert on a push or pull basis. For example, alert generator 316 may provide the alert in response to determining that the provider's earnings have deviated from the predicted earnings by a statistically significant amount. In another example, alert generator 316 may provide the alert in response to a request for data from the device associated with the content provider (e.g., the content provider logs into his or her account, etc.). In some implementations, the generated alert may also include additional information, such as potential causes of a change in earnings (e.g., a change in a search engine algorithm).

According to various other implementations, content selection service 104 may be configured to generate other alerts for any other performance metric for a first-party content provider in addition to, or in lieu of, earnings alerts. In such implementations, earnings modeler 310 may be configured to generate a prediction model for the performance metric and earnings comparator 314 may be configured to determine whether the current metric for the provider differs from the predicted metric by a threshold amount. In such cases, alert generator 316 may generate a corresponding alert for the performance metric. Other performance metrics for which alerts may be generated may include, but are not limited to, page views, impressions, clicks or other interactions with third-party content, click through rates, cost per click/content interaction metrics, revenue per mille, or any other performance metric used to evaluate the performance of first-party content in a content selection service.

Figure 4:
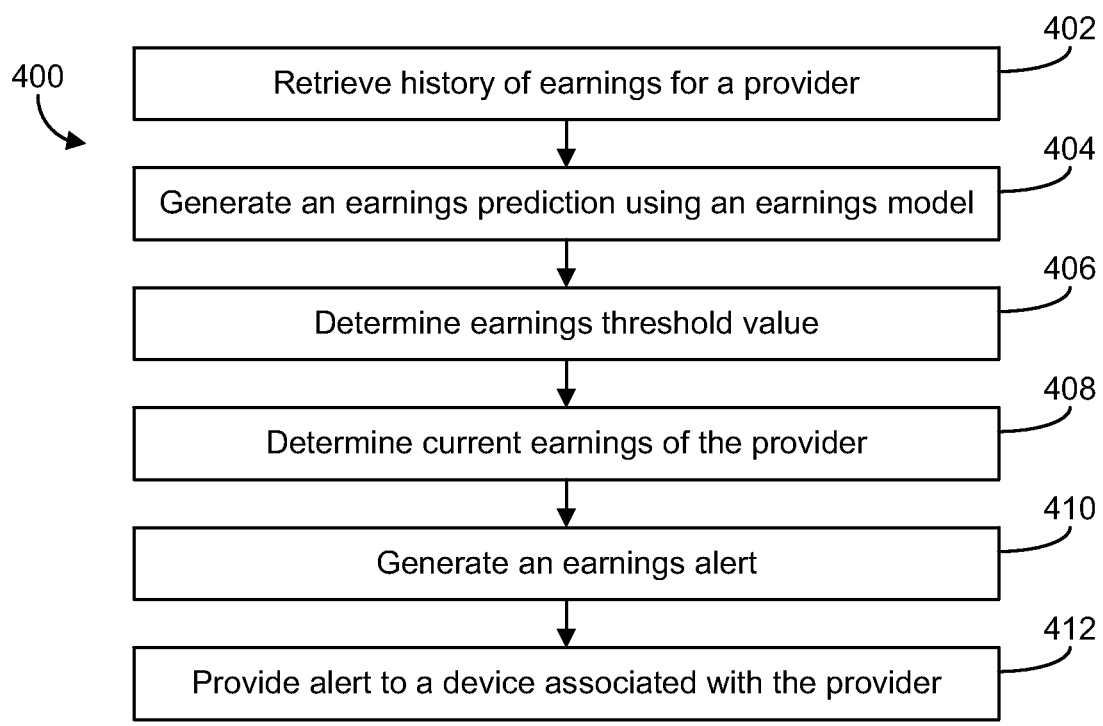
FIG. 4 is a flow diagram of the steps taken in one implementation of a process for providing an earnings alert to a first-party content provider.

Referring now to FIG. 4, a flow diagram of a process 400 for providing an earnings alert to a first-party content provider is shown, according to various implementations. Process 400 generally includes retrieving a history of earnings for the provider (step 402), generating an earnings prediction using an earnings model (step 404), determining one or more earnings threshold values based on an earnings amount predicted by the model (step 406), determining the current earnings of the provider (step 408), generating an earnings alert based on a comparison between the current earnings and the earnings threshold values (step 410), and providing the alert to a device associated with the first-party content provider (step 412). Process 400 may be implemented by one or more computing devices executing stored machine instructions. For example, process 400 may be implemented by content selection service 104 shown in detail in FIG. 3. In general, process 400 allows a first-party content provider to quickly assess and detect unexpected changes to the provider's earnings.

A history of earnings by a first-party content provider may be retrieved from a memory configured to store earnings data (step 402). In general, the retrieved earnings correspond to revenues received by a content selection service from third-party content providers and apportioned to the first-party content provider in exchange for allowing the third-party content providers to present their content with that of the first-party provider. For example, a history of provider earnings may be retrieved from provider earnings data 308 stored in memory 120 of content selection service 104, as shown in FIG. 3. The history may be from any period of time, in various implementations. For example, earnings by a first-party content provider may be retrieved for the previous hour, day, week, month, etc., or the entirety of the provider's historical earnings may be retrieved. In some cases, the retrieved earnings may be aggregated by discrete time periods. For example, the provider's cumulative earnings on a particular day may be retrieved in some cases.

The retrieved history of earnings may be used to generate an earnings prediction using an earnings prediction model (step 404). The earnings prediction model is generally configured to predict future earnings by the first-party content provider at one or more times. For example, earnings modeler 310 shown in FIG. 3 may use a retrieved history of earnings to generate modeled earnings predictions 312, which are predicted future earnings by a provider. In some implementations, the model is an exponential smoothing function applied to a time series of historical earnings. For example, the history of earnings may be broken up into discreet periods of times and a Holt-Winters exponential smoothing function applied to predict earnings at future periods of time. Other predictive models, such as neural networks, machine learning system, and the like may be used in further implementations.

One or more earnings threshold values may be generated based on the earnings predicted by the earnings prediction model (step 406). In general, an earnings threshold value corresponds to a deviation from the earnings predicted by the model deemed to be statistically significant. In one implementation, the average mean-squared error for each point in time between the actual and predicted earnings may be used to generate the threshold values. For example, the average mean-squared error may be used to generate a confidence interval defining a range of earnings around the predicted earnings in which the actual earnings is expected to fall with a defined amount of confidence (e.g., the actual daily earnings of a provider may be +/−$25 above or below the predicted earnings, with a degree of confidence of 95%). As shown in FIG. 3, in one implementation, earnings comparator 314 may determine one or more earnings threshold values based on the earnings predicted by modeled earnings predictions 312 and the actual earnings in provider earnings data 308.

Current earnings for the first-party provider may be determined (step 408). In cases in which a time series of historical earnings is used to generate the earnings, the current earnings may be from a corresponding amount of time. For example, if the time series of historical earnings includes earnings on a daily basis, the current earnings may be the latest daily earnings. Current earnings may be determined in real time or on a periodic basis. As shown in FIG. 3, for example, provider earnings data 308 may include current earnings apportioned to the first-party content provider by revenue apportioning module 306.

An earnings alert may be generated based on a comparison between the current earnings of a provider and the one or more earnings threshold values (step 410). If the current earnings are below a lower threshold or above an upper threshold relative to the predicted earnings, for example, an earnings alert may be generated. In other words, if the provider's current earnings have deviated from the predicted earnings by a certain amount, an earnings alert may be generated to notify the provider to this fact. In some implementations, the earnings alert may also include diagnostic information, such as suggested reasons for the discrepancy. For example, the alert may suggest that the provider's website is undergoing technical difficulties, that a search algorithm has changed (e.g., resulting in a shift in traffic patterns), or other such information.

The generated alert may also be provided to a device associated with the content provider (step 412). As shown in FIG. 3, for example, alert generator 316 executed by processor 118 may provide an alert to a network device via I/O hardware 302. In one implementation, the alert may be provided on a push basis (e.g., the alert may be provided in response to the alert being generated). In another implementation, the alert may be provided on a pull basis (e.g., in response to a request for such information from the device associated with the content provider). In various implementations, the generated alert may be part of a card or widget configured to analyze a provider's earnings and present warnings or other statistics regarding the earnings. For example, the alert may be provided as part of a card or widget on a webpage served to the device or as an add-on to a stand-alone application executed by the device (e.g., a mobile application or other software specifically configured to access earnings data).

Figure 5:
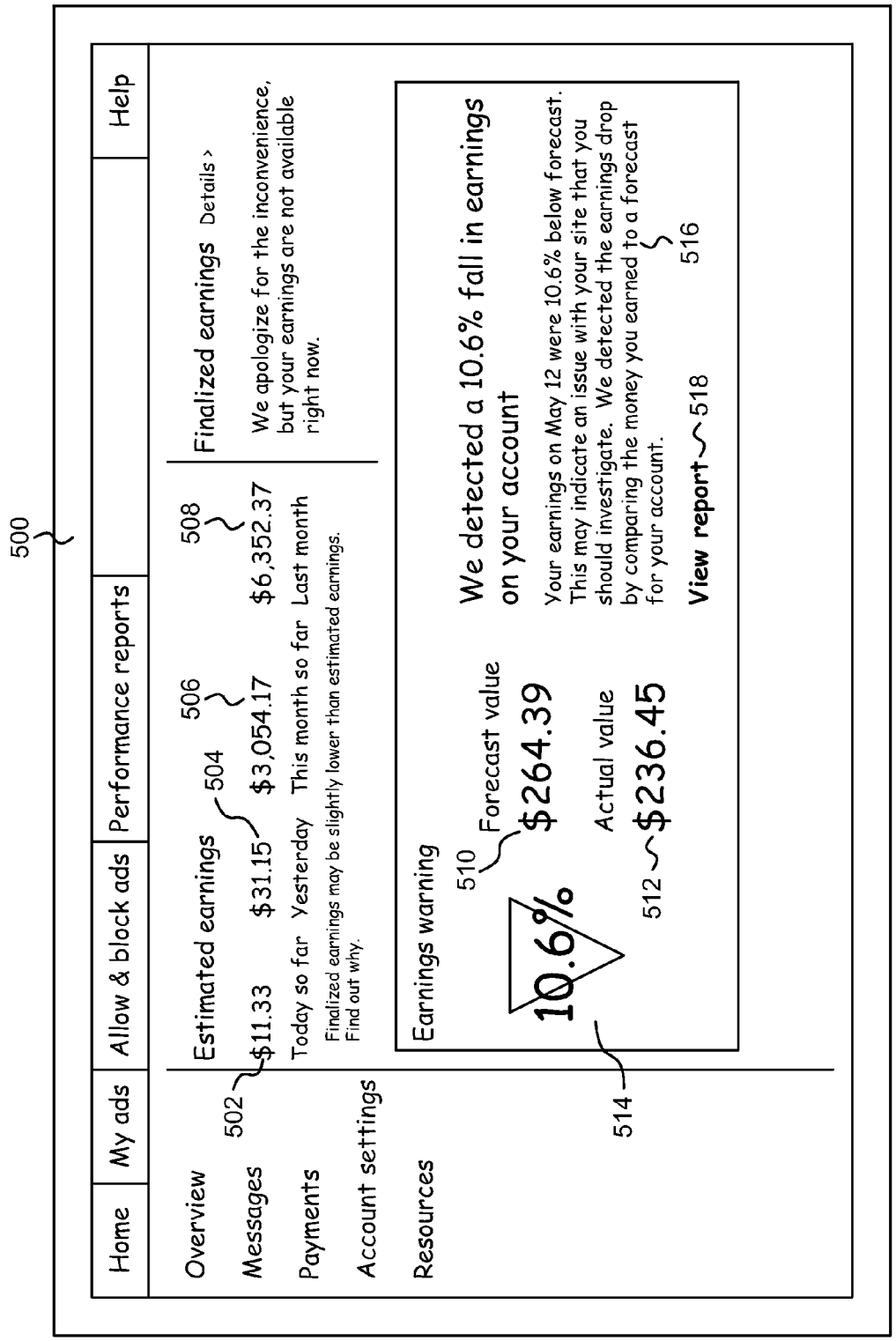
FIG. 5 is an illustration of one implementation of an earnings alert being displayed on an electronic display.

Referring now to FIG. 5, an illustration is shown of one implementation of an earnings alert 514 being displayed on an electronic display 500. In some cases, electronic display 500 is a display of a device associated with a first-party content provider. For example, an operator of a first-party website may use the device to receive earnings alert 514 on display 500. Earnings alert 514 may be generated by a content selection service (e.g., content selection service 104 shown in FIG. 3) configured to apportion revenues to the first-party content provider in exchange for the ability to place third-party content with that of the first-party content provider. In some implementations, earnings alert 514 is part of a webpage being accessed by the device. In other implementations, earnings alert 514 may be presented as part of an application specifically configured to receive and display data regarding the provider's earnings from the content selection service.

As shown, metrics and estimates regarding the earnings of a first-party content provider may be displayed on display 500. In some cases, actual earnings from any number of time periods may be shown. For example, cumulative earnings 502 for the present day, cumulative earnings 504 from the previous day, cumulative earnings 506 for the current month, or cumulative earnings 508 from the previous month may be displayed. Earnings from any other period of time may be displayed, according to various other implementations. In one implementations, earnings 502-508 are actual earnings (e.g., the amount of money actually paid to the first-party content provider). In other implementations, earnings 502-508 may be estimates subject to a final adjustment by the content selection service. For example, the content selection service may verify the legitimacy of clicks or conversions from the content provider's website and reduce the provider's earnings for those deemed illegitimate.

Earnings alert 514 may be presented on display 500, if the provider's earnings differ from the predicted earnings by a threshold amount. For example, earnings alert 514 may only be presented if the provider's earnings are more than 10% below the provider's predicted earnings. Earnings alert 514 may include a graphic, text, or other indicia that signifies an unexpected change in the provider's earnings. For example, earnings alert 514 may include a red arrow pointing downward to signify that the actual earnings are lower than expected. Earnings alert 514 may also include a numeric value signifying the percentage difference between the actual and expected earnings (e.g., the provider's earnings were 10.6% lower than expected for the time period). In some implementations, the predicted earnings 510 and the actual earnings 512 may also be presented in conjunction with earnings alert 514. An earnings alert may also be generated to signify greater than expected performance, in some implementations (e.g., the provider's earnings are greater than 10% higher than the predicted amount).

In some implementations, a message 516 of possible reasons for earnings alert 514 may be presented on display 500. Message 516 may include generic reasons for a revenue drop across all content providers or may be tailored to the specific content provider, in various implementations. For example, message 516 may suggest to the content provider that there may be a problem with the provider's website. Further details regarding earnings alert 514 may also be presented as part of a report, if input 518 is selected. For example, selection of input 518 may provide more details regarding the earnings and predicted earnings of the content provider.

Figure 6:
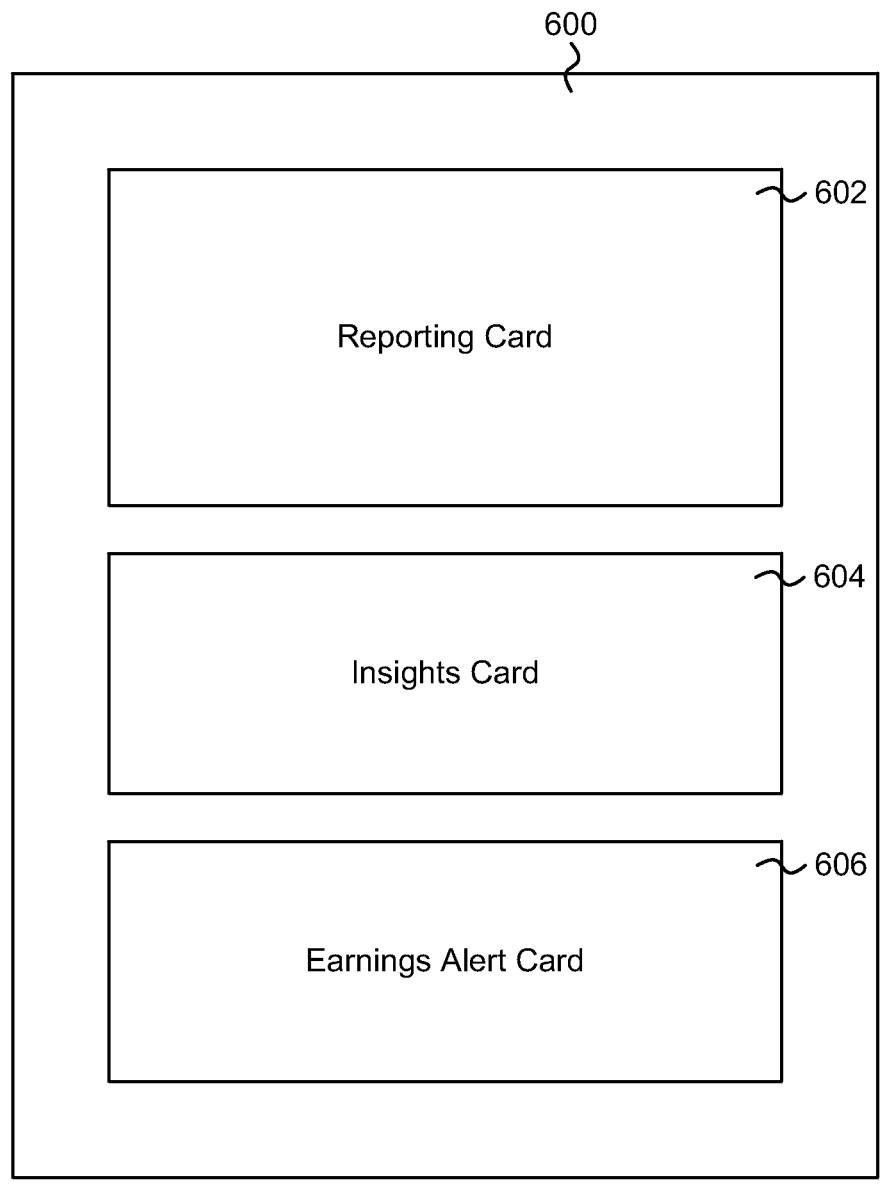
FIG. 6 is an illustration of one implementation of an earnings alert card being displayed on an electronic display.

Referring now to FIG. 6, an illustration is shown of one implementation of an earnings alert card 606 being displayed on an electronic display 600. In general, a card refers to any application add-on, widget, or the like in which a particular type of information is grouped and presented. In various implementations, a single application may be configured to support the use of multiple cards. For example, an application for a mobile device may support cards devoted to the weather forecast, travel information (e.g., flight times, traffic delays, etc.), and the like. As shown in FIG. 6, cards 602-606 for use by a first-party content provider may be included as part of the same application or interface (e.g., a webpage) that presents information regarding the provider's account with a content selection service. Each of cards 602-606 may be generated by a card service (e.g., the content selection service or another computing device in communication therewith) and provided to the device having display 600. For example, the card service may be implemented as an application programming interface (API). Card sources (e.g., sources of data used in the cards) may be registered with the card service and queried (e.g., via API or another mechanism) for data each time the card service receives an applicable request. In one implementation, card sources may be queried in parallel by the service. In some implementations, the service may impose a time deadline on the card services to report their respective data. After the deadline, the service may collate all returned cards and provide the cards to any client devices, such as the device having display 600. The card service may also impose a limit on the number of cards and/or the number of cards of a certain type for the client device. In one implementation, the card service may only query card sources associated with card types that are supported by the client device.

Card 602 may be a card configured to report on traffic to a first-party content provider's website, revenues earned by the provider by allowing third-party content to be included with the website, performance comparisons with peer websites, or the like. Card 602 may include text, graphs, charts, or any other form of indicia regarding the reports. For example, card 602 may include information regarding the monthly earnings of the provider in relation to those of peer providers (e.g., providers that have websites devoted to the same topics, websites that have similar traffic, etc.). In one implementation, card 602 may include earnings estimates for the provider. For example, card 602 may display a chart that shows the actual and predicted earnings of the provider.

Card 604 may be an insight card configured to give the provider greater insight into his or her performance. In general, an insight card uses data aggregated from one or more card sources to identify trends or changes in the provider's performance. For example, card 604 may provide a comparison between earnings by the provider in different months or years. In another example, an insight card may be associated with a particular event, such as if the provider redesigns his or her website.

Card 606 may be an earnings alert card configured to warn a content provider if his or her earnings differ from a predicted earnings value by a threshold amount. Earnings alert card 606 may be considered an insight card, since it performs some analysis on the provider's data to give the provider insight into his or her performance. In one implementation, card 606 may be implemented in a manner similar to earnings alert 514 shown in FIG. 5. In various implementations, card 606 may include recommendations to the publisher (e.g., corrective actions that may be taken by the publisher) and/or an option to view one or more detailed reports (e.g., an hourly timeline report of earnings from the past twenty four hours compared to the predicted earnings).

If multiple alerts have been generated, card 606 may group the alerts in a single interface for review by the provider. For example, the service may coalesce the alerts into a single alert that displays the total impact on the provider's revenues.

Cards 602-606 may be presented on display 600 at any time, according to various implementations. In some implementations, cards 602-606 are assigned priorities by the card service that are used to control which cards are displayed on display 600. For example, earnings alert card 606 may be assigned a high priority whenever an earnings alert is generated. Cards having priority scores less than a predefined minimum may have a random offset added to their priority scores, thereby causing these cards to be randomly shown during different login events. In some implementations, the provider may also control which cards are even eligible to be shown. For example, the content provider may be able to select an option to never see card 604 again or to add cards that are of interest to the provider.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of generating earnings alerts for computer network-connected content providers, comprising:
    retrieving, by a content selection service from a storage device, a history of earnings for a content provider received in exchange for presenting third-party content with content from the content provider to client devices over a computer network, the earnings associated with various client device types;
    generating, by an earnings modeler module of the content selection service, predicted future earnings of the content provider in association with the various client device types using an earnings forecast model based on the history of earnings;
    determining, by the earnings modeler module, an earnings threshold value at which differences from the predicted future earnings are statistically significant, wherein the earnings threshold is one of:
        ten percent above or below predicted future earnings,
        twenty-five percent above or below predicted future earnings, or
        an average mean-squared error for the predicted future earnings;
    determining, by an earnings comparator module of the content selection service, current earnings of the content provider in association with the various client device types by verifying the legitimacy of clicks or conversions from a website of the content provider and reducing the current earnings for clicks or conversions deemed illegitimate;
    generating, by an alert generator module of the content selection service, an earnings alert based on a determination, by the earnings comparator module, that the difference between the current earnings of the content provider associated with at least one device type and the predicted earnings associated with the at least one device type exceeds the earnings threshold value, the earnings estimate alert generated as an alert card; and providing, by the alert generator module, the earnings alert to an application add-on on a device associated with the content provider over the computer network, the application add-on displaying the earnings estimate alert on a display of the device associated with the content provider.

2. The method of claim 1, further comprising:
generating the earnings forecast model as an exponential smoothing model using the history of earnings.

3. The method of claim 1, wherein determining the earnings threshold value comprises:
determining the average mean-squared error for the predicted future earnings; and
using the average mean-squared error to determine the earnings threshold value.

4. The method of claim 1, wherein the earnings alert is provided to the device associated with the content provider in response to a request received from the device.

5. The method of claim 1, wherein the earnings alert is provided to the device associated with the content provider automatically in response to generating the alert.

6. The method of claim 1, wherein the current earnings comprise earnings from the current day or earnings from any of the previous three days.

7. The method of claim 6, further comprising:
providing the earnings alert within a card of a stand-alone application.

8. A system for generating earnings alerts for computer network-connected content providers, the system comprising one or more processors configured to:
retrieve, by a content selection service from a storage device, a history of earnings for a content provider received in exchange for presenting third-party content with content from the content provider to client devices over a computer network, the earnings associated with various client device types;
generate, by an earnings modeler module of the content selection service, predicted future earnings of the content provider in association with the various client device types using an earnings forecast model based on the history of earnings;
determine, by the earnings modeler module, an earnings threshold value at which differences from the predicted future earnings are statistically significant using the predicted future earnings of the content provider, wherein the earnings threshold is one of:
ten percent above or below the predicted future earnings,
twenty-five percent above or below the predicted future earnings, or
an average mean-squared error for the predicted future earnings;
determine, by an earnings comparator module of the content selection service, current earnings of the content provider in association with the various client device types by verifying the legitimacy of clicks or conversions from a website of the content provider and reducing the current earnings for clicks or conversions deemed illegitimate;
generate, by an alert generator module of the content selection service, an earnings alert based on a determination, by the earnings comparator module, that the difference between the current earnings of the content provider associated with at least one device type and the predicted earnings associated with the at least one device type exceeds the earnings threshold value, the earnings estimate alert generated as an alert card; and providing, by the alert generator module, the earnings alert to an application add-on on a device associated with the content provider over the computer network, the application add-on displaying the earnings estimate alert on a display of the device associated with the content provider.

9. The system of claim 8, wherein the one or more processors are configured to generate the earnings forecast model by generating an exponential smoothing model using the history of earnings.

10. The system of claim 8, wherein the one or more processors are configured to determine the earnings threshold value by determining the average mean-squared error for the predicted future earnings and using the average mean-squared error to determine the earnings threshold value.

11. The system of claim 8, wherein the earnings alert is provided to the device associated with the content provider in response to a request received from the device.

12. The system of claim 8, wherein the earnings alert is provided to the device associated with the content provider automatically in response to generating the alert.

13. The system of claim 8, wherein the current earnings comprise earnings from the current day or earnings from any of the previous three days.

14. The system of claim 8, wherein the earnings alert is provided within a card of a stand-alone application.

15. A computer-readable storage medium having machine instructions stored therein, the instructions being executable by a processor to cause the processor to perform operations comprising:
retrieving, by a content selection service from a storage device, a history of earnings for a content provider received in exchange for presenting third-party content with content from the content provider to client devices over a computer network, the earnings associated with various client device types;
generating, by an earnings modeler module of the content selection service, predicted future earnings of the content provider in association with the various client device types using an earnings forecast model;
determining, by the earnings modeler module, an earnings threshold value at which differences from the predicted future earnings are statistically significant, wherein the earnings threshold is one of:
ten percent above or below predicted future earnings,
twenty-five percent above or below predicted future earnings, or
an average mean-squared error for the predicted future earnings;
determining, by an earnings comparator module of the content selection service, current earnings of the content provider in association with the various client device types by verifying the legitimacy of clicks or conversions from a website of the content provider and reducing the current earnings for clicks or conversions deemed illegitimate;
generating, by an alert generator module of the content selection service, an earnings alert based on a determination, by the earnings comparator module, that the difference between the current earnings of the content provider associated with at least one device type and the predicted earnings associated with the at least one device type exceeds the earnings threshold value, the earnings estimate alert generated as an alert card; and providing, by the alert generator module, the earnings alert to an application add-on on a device associated with the content provider over the computer network, the application add-on displaying the earnings estimate alert on a display of the device associated with the content provider.

16. The computer-readable storage medium of claim 15, wherein the operations comprise:
   generating the earnings forecast model as an exponential smoothing model using the history of earnings.

17. The computer-readable storage medium of claim 15, wherein determining the earnings threshold value comprises:
   determining the average mean-squared error for the predicted future earnings; and
   using the average mean-squared error to determine the earnings threshold value.

18. The computer-readable storage medium of claim 15, wherein the earnings alert is provided to the device associated with the content provider in response to a request received from the device.

19. The computer-readable storage medium of claim 15, wherein the earnings alert is provided within a card of a stand-alone application.

20. The computer-readable storage medium of claim 15, wherein the current earnings comprise earnings from the current day.

* * * * *